United States Patent [19]

Sugata et al.

[11] 4,295,398

[45] Oct. 20, 1981

[54] WORKPIECE SUPPORTING DEVICE

[75] Inventors: Yoshiaki Sugata; Kiyoshi Miyagawa, both of Kariya, Japan

[73] Assignee: Toyoda Koki Kabushiki Kaisha, Kariya, Japan

[21] Appl. No.: 132,426

[22] Filed: Mar. 21, 1980

[30] Foreign Application Priority Data

Mar. 22, 1979 [JP] Japan .................................. 54-37377

[51] Int. Cl.³ .............................................. B23B 23/00
[52] U.S. Cl. .................................................. 82/31
[58] Field of Search ............................................ 82/31

[56] References Cited

U.S. PATENT DOCUMENTS 2,586,127  2/1952  Von Zelewsky ........................ 82/31
2,874,600  2/1959  Jeanneret ............................... 82/31
3,653,286  4/1972  Okada ..................................... 82/31
3,867,856  2/1975  Ota ......................................... 82/31

Primary Examiner—Harrison L. Hinson
Attorney, Agent, or Firm—Oblon, Fisher, Spivak, McClelland & Maier

[57] ABSTRACT

In a workpiece supporting device for supporting a workpiece, a holding shaft carrying at its one end a center member adapted to support one end of the workpiece is slidably received in a housing. A hydraulic cylinder is formed in the housing and a sleeve member is rotatably mounted on a piston rod of the hydraulic cylinder with a connecting member being threadedly engaged with the sleeve member. A spring is adjustably interposed between the holding shaft and the connecting member and relative axial movement between the holding shaft and the connecting member is limited within a predetermined distance.

5 Claims, 4 Drawing Figures

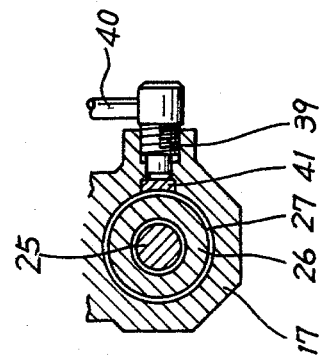
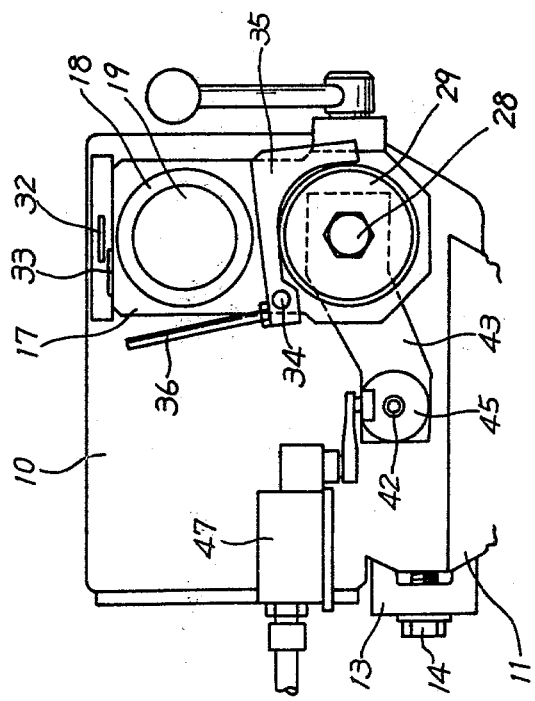

WORKPIECE SUPPORTING DEVICE

BACKGROUND OF THE INVENTION

1. Field of the Invention:

The present invention relates to a workpiece supporting device for supporting a workpiece by center members.

2. Description of the Prior Art:

The conventional workpiece supporting device for supporting a workpiece by center members is somewhat satisfactory in performing its intended function. However, the device is complicated in construction, thus necessarily making it relatively expensive in cost.

Moreover, since the hydraulic actuator for moving the holding shaft carrying the center member toward and away from the workpiece is also connected to act on a spring for applying a holding force to the workpiece being supported by the center members, the spring is excessively compressed each time the hydraulic actuator is operated to retract the holding shaft from the workpiece. Therefore, there is a possibility that the spring will be damaged by repeated excessive compression.

Furthermore, such conventional device cannot meet the requirement that the holding shaft be accurately adjusted to a desired position for supporting, for example, workpieces with the same length but with slightly different center bores.

SUMMARY OF THE INVENTION

It is, therefore, an object of the present invention to provide a new and improved workpiece supporting device which is comparatively simple in construction and inexpensive in cost.

Another object of the present invention is to provide a new and improved workpiece supporting device wherein a spring for applying a holding force to the workpiece being supported by center members has a relatively long life.

A further object of the present invention is to provide a new and improved workpiece supporting device wherein a holding shaft carrying a center member is accurately adjustable to a desired position.

Briefly, according to the present invention, these and other objects are achieved by providing a workpiece supporting device for supporting a workpiece, as mentioned hereinbelow. A holding shaft is slidably received in a housing and a center member is carried on one end of the holding shaft, adapted to support one end of the workpiece. A hydraulic cylinder is formed in the housing and includes a piston slidably received in the housing and a piston rod integrally formed with the piston and extending from the housing in parallel relationship with the axis of the holding shaft. A sleeve member is rotatably but non-slidably mounted on the piston rod and formed with a threaded portion at the periphery thereof and a device is provided for rotating the sleeve member. A connecting member is threadedly engaged with the threaded portion of the sleeve member. An adjusting member is threadably engaged with the connecting member in coaxial relationship with the holding shaft a spring is interposed between the holding shaft and the adjusting member for applying a holding force to the workpiece being supported on the center member. A device is also arranged between the holding shaft and the connecting member for limiting relative axial movement within a predetermined distance.

In another aspect of the present invention, scale members are arranged between the housing and the connecting member for indicating the position of the connecting member relative to the housing when the piston is at the retracted position thereof.

In still another aspect of the present invention, an end member is mounted on the sleeve member in abuttable relationship with the connecting member. A spacing member is pivotably mounted on the connecting member so as to be positioned between the connecting member and the end member.

BRIEF DESCRIPTION OF THE DRAWINGS

Other objects, features and attendant advantages of the present invention will be more fully appreciated as the same becomes better understood from the following detailed description when considered in connection with the accompanying drawings, in which like reference numerals designate like or corresponding parts throughout the several views, and wherein:

FIG. 3 is a side view taken on a direction indicated by the arrow III of FIG. 1; and FIG. 4 is a partial view taken along the line IV—IV of FIG. 1.

DETAILED DESCRIPTION OF THE PREFERRED EMBODIMENT

Figure 1:
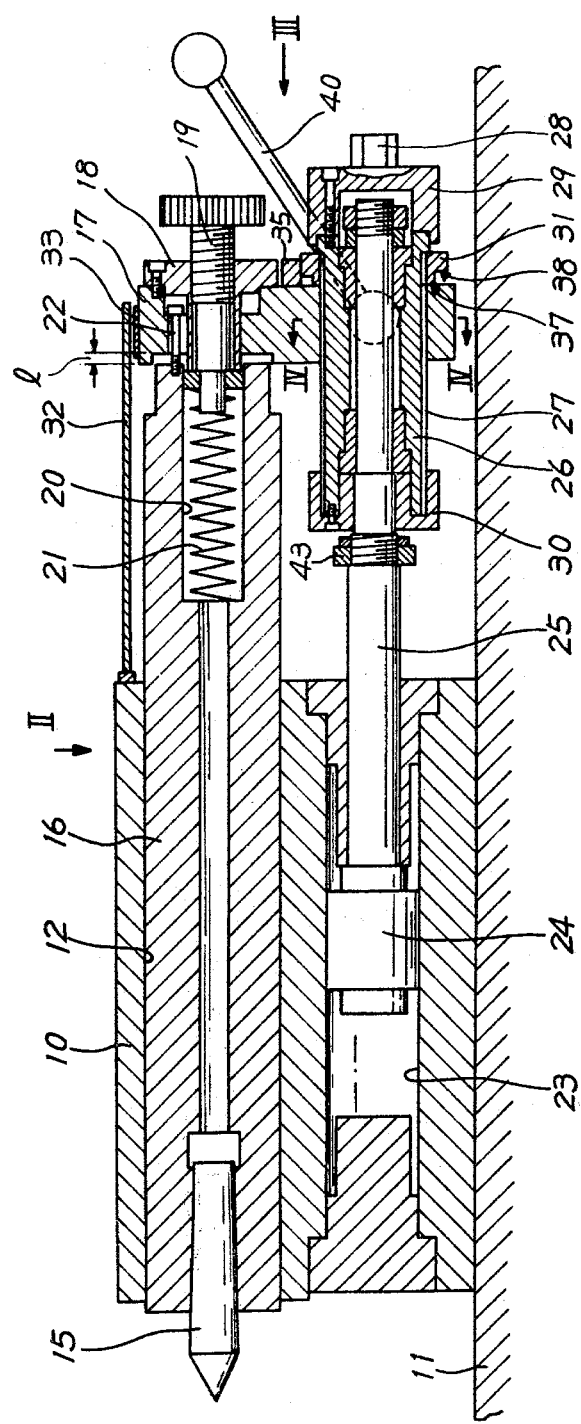
FIG. 1 is a sectional front view showing a preferred embodiment of a workpiece supporting device constructed according to the present invention.
Figure 2:
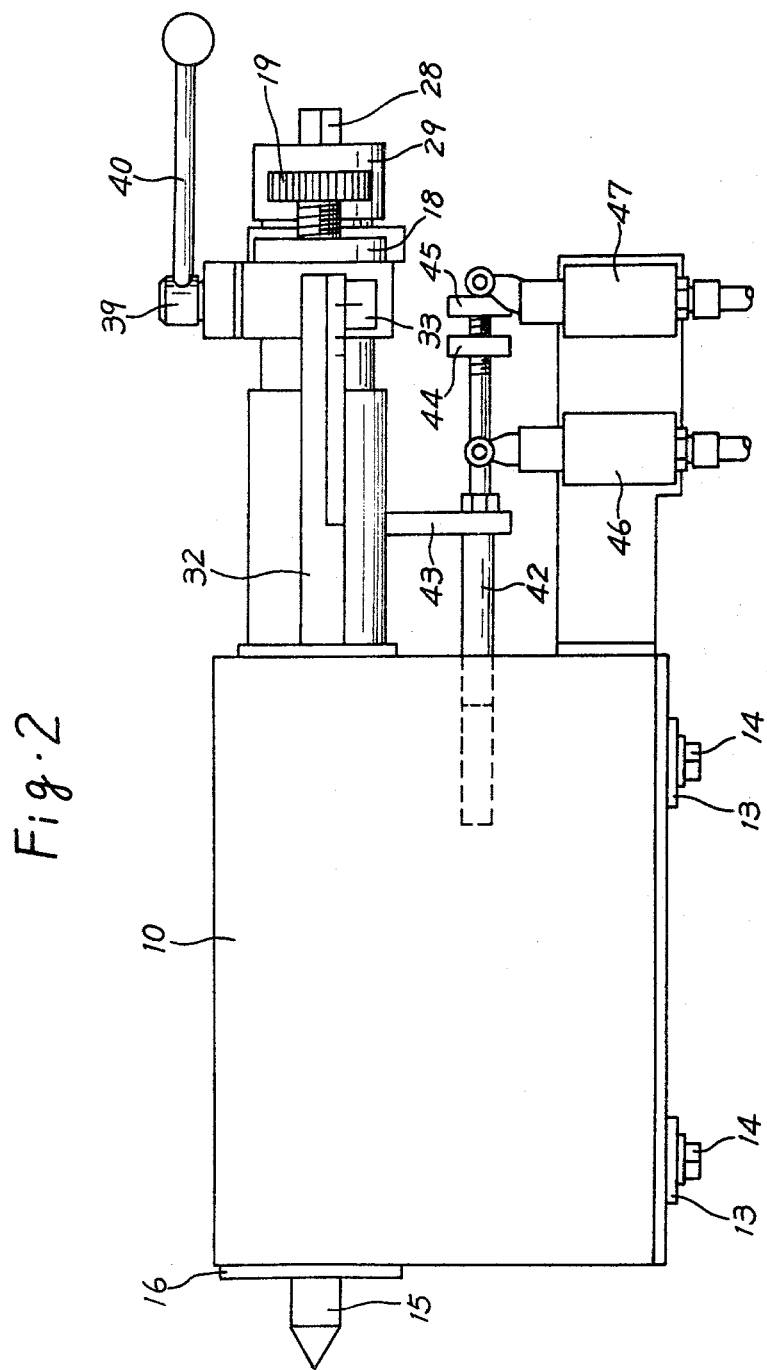
FIG. 2 is a plan view taken in a direction indicated by the arrow II of FIG. 1.

Referring now to the drawings and more particularly to FIGS. 1 and 2 thereof, a tailstock housing 10 is shown secured to a table 11 by fittings 13 and bolts 14. A hollow holding shaft 16 carrying a tailstock center member 15 at one end thereof for supporting one end of a workpiece (not shown) is slidably received in a bore 12 of the tailstock housing 10. The other end of the holding shaft 16 projects from the tailstock housing 10 and faces one side of a connecting member 17. An adjusting bolt 19 which engages a nut member 18 secured to the other side of the connecting member 17 extends through the connecting member 17 to seat a pushing spring 21 received in a bore 20 of the holding shaft 16. A bolt 22 is threaded into the other end of the holding shaft 16 through the connecting member 17 and is abuttable at its head portion with the other side of the connecting member 17 to limit the axial movement of the holding shaft 16 biased by the spring 21 so that a predetermined distance (l) is maintained between the holding shaft 16 and the connecting member 17 under the retracted state of the holding shaft 16, as best shown in FIG. 1.

A hydraulic cylinder 23 is formed in the housing 10 within which a piston 24 is slidably received in parallel relationship to the axis of the holding shaft 16. A piston rod 25 extending from the piston 24 rotatably supports a sleeve member 26 while being prevented from axial movement. The sleeve member 26 is provided with an externally threaded portion 27 which engages the connecting member 17. An adjusting member 29 provided with a hexagon head 28 is fixed to the end of the sleeve member 26. Accordingly, rotation of the adjusting member 29 by the hexagon head 28 causes the movement of the connecting member 17 in the direction of the axis of the holding shaft 16 through the threaded engagement of the externally threaded portion 27 with the connecting member 17 to permit positional adjustment of the connecting member 17. End members 30, 31 are respectively secured to the opposite ends of the sleeve member 26 to limit the movement of the connecting member 17 therebetween.

As best shown in FIG. 3, a spacing member 35 with a predetermined precise width is pivotably received on a shaft 34 which is mounted on the side wall of the connecting member 17. A lever 36 is secured to the spacing member 35 for manual manipulation thereof.

The end member 31 is provided with an end face 37 abuttable with the side wall of the connecting member 17 and a stepped face 38 spaced a predetermined precise distance from the end face 37. Accordingly, the connecting member 17 can be accurately positioned at three different positions. That is, at a first position, the connecting member 17 is in abutting engagement with the end face 37 of the end member 31. At a second position the spacing member 35 is positioned between the connecting member 17 and the end face 37. At a third position, the spacing member 35 is positioned between the connecting member 17 and the stepped face 38. This adjustment of the connecting member 17 permits the holding shaft 16 to support various workpieces with different axial lengths.

A scale 32 is secured to the housing 10 and an associated reference scale 33 is secured to the connecting member 17 so that the position of the connecting member 17 may be visually observed. As shown in FIG. 2, a dog bar 42, slidably received in the housing 10, is secured to a bracket 43 which is, in turn, secured to the piston rod 25. Dogs 44 and 45 are secured to the dog bar 42 to actuate limit switches 46 and 47, respectively, for confirmation of forward and backward end positions of the holding shaft 16. As shown in FIG. 4, a clamp lever 40 has at the end thereof a threaded portion 39 which is in threaded engagement with the connecting member 17. A shoe member 41 is received in the connecting member 17 between the sleeve member 26 and the threaded portion 39 of the clamp lever 40. Accordingly, manipulation of the clamp lever 40 causes axial movement of the threaded portion 39 to push the shoe member 41 toward the sleeve member 26, thereby preventing relative movement of the connecting member 17 with respect to the sleeve member 26.

The operation of the above described device will now be described. FIGS. 1 and 2 show the piston 24 retracted to its right end position and thus the holding shaft 16 is also retracted through the connecting member 17. Under this condition, a holding force applied to a workpiece is properly set by adjusting compression force of the spring 21, which is performed by rotation of the adjusting bolt 19. Thereafter, when the piston 24 is moved to the left, the tailstock center member 15 carried by the holding shaft 16 is moved to the left through the connecting member 17 to support a workpiece in cooperation with a headstock center.

Under normal operations, the aforementioned operations are repeated for supporting workpieces with the same axial length. However, when a workpiece with different length is to be worked, the following operations are required to alter the distance between centers. At first, the shoe member 41 is lossened by rotating the clamp lever 40 so as to permit rotation of the sleeve member 26 relative to the connecting member 17. Thereafter, an operator rotates the hexagon head 28 to move the connecting member 17 and holding shaft 16 gradually through the threaded engagement of the threaded portion 27 with the connect-in- member 17 and the spring 21 until a desired distance between center members is nearly obtained while observing the scale 32 and the reference scale 33. The lever 36 is subsequently swung to position the spacing member 35 within the space between the side wall of the connecting member 17 and the end face 37 or the stepped face 38 of the end member 31, depending upon the length of the workpiece to be supported. The hexagon head 28 is again rotated in the reverse direction to tightly position the spacing member 35 between the side wall of the connecting member 17 and the end face 37 or the stepped face 38 of the end member 31. Accordingly, the holding shaft 16 is accurately adjusted to the desired position. Finally, the clamp lever 40 is rotated to push the shoe member 41 toward the sleeve member 26 for preventing the connecting member 17 from moving relative to the sleeve member 26.

While the invention has been described by means of the preferred embodiment, it should be understood that the novel characteristics of the invention may be incorporated in other structural forms without departing from the spirit and scope of the invention. Accordingly, it is to be understood that within the scope of the appended claims, the invention may be practiced otherwise than as specifically described herein.

What is claimed as new and desired to be secured by Letters Patent of the United States is:

1. A workpiece supporting device comprising:
    a housing;
    a holding shaft slidably received in said housing;
    a center member carried on one end of said holding shaft and adapted to support one end of said workpiece;
    a hydraulic cylinder formed in said housing and including a piston slidably received in said housing and a piston rod integrally formed with said piston and extending from said housing in parallel relationship with the axis of said holding shaft;
    a sleeve member rotatably but non-slidably mounted on said piston rod and formed with a threaded portion at the periphery thereof;
    means for rotating said sleeve member;
    a connecting member threadedly engaged with said threaded portion of said sleeve member;
    an adjusting member threadedly engaged with said connecting member in coaxial relationship with said holding shaft;
    spring means interposed between said holding shaft and said adjusting member for applying a holding force to said workpiece being supported on said center member; and
    means arranged between said holding shaft and said connecting member for limiting relative axial movement therebetween within a predetermined distance.

2. A workpiece supporting device as set forth in claim 1, further comprising:
    scale means arranged between said housing and said connecting member for indicating the position of said connecting member relative to the housing when said piston is at the retracted position thereof.

3. A workpiece supporting device as set forth in claims 1 or 2, said limiting means comprising:
    a bolt threaded into said holding shaft through said connecting member, the head portion thereof being abuttable with said connecting member to prevent the movement of said holding shaft relative to said connecting member beyond said predetermined distance.

4. A workpiece supporting device as set forth in claims 1 or 2 further comprising:
   clamping means mounted on said housing for preventing relative movement between said sleeve member and said connecting member.

5. A workpiece supporting device as set forth in claims 1 or 2 further comprising:
   an end member mounted on said sleeve member in abuttable relationship with said connecting member; and
   a spacing member pivotably mounted on said connecting member to be positioned between said connecting member and said end member.

* * * * *